United States Patent [19]
Samiotes et al.

[11] Patent Number: 5,767,518
[45] Date of Patent: Jun. 16, 1998

[54] FIBER OPTIC X-RAY EXPOSURE CONTROL SENSOR

[75] Inventors: Nicholas G. Samiotes, Westwood; David R. Ghioni, Norfolk, both of Mass.

[73] Assignee: Westwood Biomedical, Westwood, Mass.

[21] Appl. No.: 753,442

[22] Filed: Nov. 27, 1996

[51] Int. Cl.$^6$ .................................................. H05G 1/44
[52] U.S. Cl. ..................... 250/370.13; 378/108; 378/182
[58] Field of Search ........................... 378/108, 182–188; 250/370.11

[56] References Cited

U.S. PATENT DOCUMENTS

| | | | |
|---|---|---|---|
| 4,053,774 | 10/1977 | Berdahl | 250/355 |
| 4,461,953 | 7/1984 | Allemand et al. | 250/374 |
| 4,639,943 | 1/1987 | Heinze et al. | 378/96 |
| 4,679,217 | 7/1987 | Fairchild | 378/97 |
| 4,733,409 | 3/1988 | Haltrich | 378/167 |
| 4,905,265 | 2/1990 | Cox et al. | 378/99 |
| 4,979,201 | 12/1990 | Kruger | 378/185 |
| 5,267,295 | 11/1993 | Strommer | 378/97 |
| 5,391,879 | 2/1995 | Tran et al. | 250/370 |
| 5,444,756 | 8/1995 | Pai et al. | 378/98.8 |
| 5,446,780 | 8/1995 | Aichenger et al. | 378/108 |
| 5,485,501 | 1/1996 | Aichinger | 378/98.7 |

*Primary Examiner*—Craig E. Church
*Attorney, Agent, or Firm*—Hayes, Soloway, Hennessey, Grossman & Hage, P.C.

[57] ABSTRACT

An X-ray detection device for providing an output signal the value of which can be used to determine the radiation received at a selected region of an object, such as a patient, comprising a transmitter for being energized by X-rays, said transmitter producing radiation of a wavelength different from that of said X-rays, said transmitter aligned with X-ray film to be exposed, and wherein said transmitter is of substantially the same cross-sectional area of said X-ray film, a detector for detecting said radiation wherein said detector is substantially transparent to incident X-ray radiation, and a sensor connected to said detector, said sensor generating an output signal related to said radiation, the value of said output signal which can be used to determine the x-ray radiation received at said transmitter to provide X-ray exposure output readings at one or more selected locations of a patient's body.

9 Claims, 1 Drawing Sheet

FIBER OPTIC X-RAY EXPOSURE CONTROL SENSOR

FIELD OF THE INVENTION

The present invention relates generally to a control sensor for use in radiation systems, such as X-ray systems, wherein the sensor detects the level of radiation exposure so as to provide an output signal which can be used to determine the amount of radiation exposure.

BACKGROUND OF THE INVENTION

A recent review of the prior art regarding structures for use in determining the amount of radiation received at one or more selected regions of an object is set out in U.S. Pat. No. 4,479,217. As reported therein it is desirable to provide systems which can effectively control the amount of X-ray expose to which an object is subjected, particularly where such equipment is to be used with objects such as human or animal patients. In order to control exposure, an appropriate determination of the radiation to which the object has been exposed is required and various means can be used for automatically shutting off the equipment when the total exposure reaches a preselected level.

It has been common for medical practitioners to place X-ray film and one or more phosphorous scintillating sheets (intensifier screens) for converting X-rays to photons within a cassette housing so that the overall cassette package can be positioned behind an object to be X-rayed, for example, at an appropriate position of the anatomy of a patient in alignment with the portion of the anatomy at which the X-rays are to be detected. One or more of the detector means are then positioned adjacent to and externally to the film cassette to detect the level of X-ray radiation at such position and to provide an output signal for supply to electronic circuitry where it can be suitably integrated as a function of time so that the integrated output signal provides an integrated measurement thereof which is proportional to the amount of X-ray radiation which has been received by the patient over such integration time interval. When the integrated measurement reaches a preselected level, appropriate circuitry can be used to automatically shut off the X-ray equipment.

In U.S. Pat. No. 4,053,774, a detection operation is provided utilizing a structure which is separate from and not capable of being fixedly attached to the film cassette. The structure disclosed includes an array of series-connected detectors (e.g., photovoltaic cells) individually supported on an insulator substrate. A suitable scintillator sheet or screen may also be mounted adjacent the detector cells for amplifying the light photon level for detection by the photovoltaic cells.

A similar approach has been reported in a system made and sold by Advanced Instrument Development Inc. of Melrose Park, Ill., under the designation Mobil-AID®. Such system uses separate structure in the form of a "paddle" which contains an ion chamber detector placed at a selected location within the paddle structure. The paddle is placed over the patient so that the ion chamber field designation (e.g., a circle) is aligned with the portion of the patient's anatomy of interest. The paddle is then removed from above the patient and slid under the patient in alignment with the film cassette.

One disadvantage of the above two systems is that the paddle or separate structure requires a manual alignment of the areas of interest so that a separate detector and the film cassette structure are both in line with the selected anatomical region of the patient. This procedure can give rise to errors in the correct positioning of the separate paddle or cassette devices and, moreover, each time a new film cassette is used, the alignment procedure must be repeated thereby adding to the overall time for setting up the patient for X-ray purposes.

The '217 patent discloses a method to overcome the above problems by providing an effectively integral structure which includes one or more scinitillating sheets, an X-ray film, and one or more detector arrays, positioned within a single structure, such as a cassette structure. In a preferred embodiment, one or more detector arrays are positioned at preselected regions within the cassette structure so that the same cassette can be used to provide X-ray exposure readings at one or more selected locations of the patients body.

In addition, to the above, the following prior art patents have been uncovered by way of background, in connection with X-ray detection devices in general: U.S. Pat. No. 5,391,879, which describes a radiation detector containing a fiber optic network, along with an array of pixelized phosphors on the X-ray incident side of the fiber optic network, and an array of pixelized sensors optically coupled to the other side of the fiber optic network. In U.S. Pat. No. 5,444,756, there is disclosed a solid state radiation detector having an improved method of reading data from individual sensors and an X-ray machine configured with such solid state radiation detector. In U.S. Pat. No. 5,485,501 there is disclosed a method for the operation of an automatic X-ray exposure unit the radiation detector composed of a matrix of detector elements. In U.S. Pat. No. 5,267,295 there is disclosed a method for regulating the exposure of an X-ray film to an optimal level, wherein the radiation that has been passed through an object is measured by detectors and based on this measurement, the time of exposure is regulated. In U.S. Pat. No. 4,905,265 an X-ray imaging system is disclosed comprising an X-ray source for producing an X-ray beam and an X-ray detector, the detector comprising a solid state integrated circuit having a silicon substrate and a plurality of charge storage devices. In U.S. Pat. No. 4,639,943, there is disclosed an X-ray diagnostic system with automatic control of radiation exposure, which in part is said to contain a control loop with a first regulating stage connected to a first radiation detector disposed after the X-ray intensifier, followed by a second radiation detector disposed proximate the X-ray tube for supplying an output signal to a second regulating stage in the control loop. In U.S. Pat. No. 4,733,409, a cassette receptacle for X-ray film cassettes is disclosed, and finally, U.S. Pat. No. 4,461,953 discloses a detector of X-rays having passed through an object, comprising at least one ionization chamber containing a gas ionizable by the rays issuing from the object and, in this chamber, a plate and a series of electrodes for collecting the charges resulting from the ionization of the gas.

However, notwithstanding all of the detections systems noted above, there has been a long-standing need for the development of an X-ray detection device that would be easy to use in combination with the commonly used cassette receptacles, but which would not require structural modification thereof as emphasized, e.g., in the '217 patent discussed above. In other words, to perform a modification to the cassettes for installation of the detector means, the cassettes have to be removed from the medical practitioner which is therefore disruptive in addition to presenting a temporary shortage of cassettes until returned.

Accordingly, it is an object of this invention to provide a radiation detector for use with X-ray cassette housings wherein the cassette housing would not have to be structurally modified, as disclosed in the prior art.

More specifically, it is an object of this invention to provide a radiation detector which is removed from the cassette and placed in front of a cassette tray which holds the cassettes, wherein the detector is substantially invisible to X-rays, so that X-ray imaging can proceed without disadvantages of the prior art designs.

SUMMARY OF THE INVENTION

An X-ray detection device for providing an output signal the value of which can be used to determine the radiation received at a selected region of an object, such as a patient, comprising a transmitter for being energized by X-rays, said transmitter producing radiation of a wavelength different from that of said X-rays, said transmitter aligned with X-ray film to be exposed, and wherein said transmitter is of substantially the same cross-sectional area of said X-ray film, a detector for detecting said radiation wherein said detector is substantially transparent to incident X-ray radiation, and a sensor connected to said detector, said sensor generating an output signal related to said radiation, the value of said output signal which can be used to determine the x-ray radiation received at said transmitter to provide X-ray exposure output readings at one or more selected locations of a patient's body.

DETAILED DESCRIPTION OF THE PREFERRED EMBODIMENT

Figure 1:
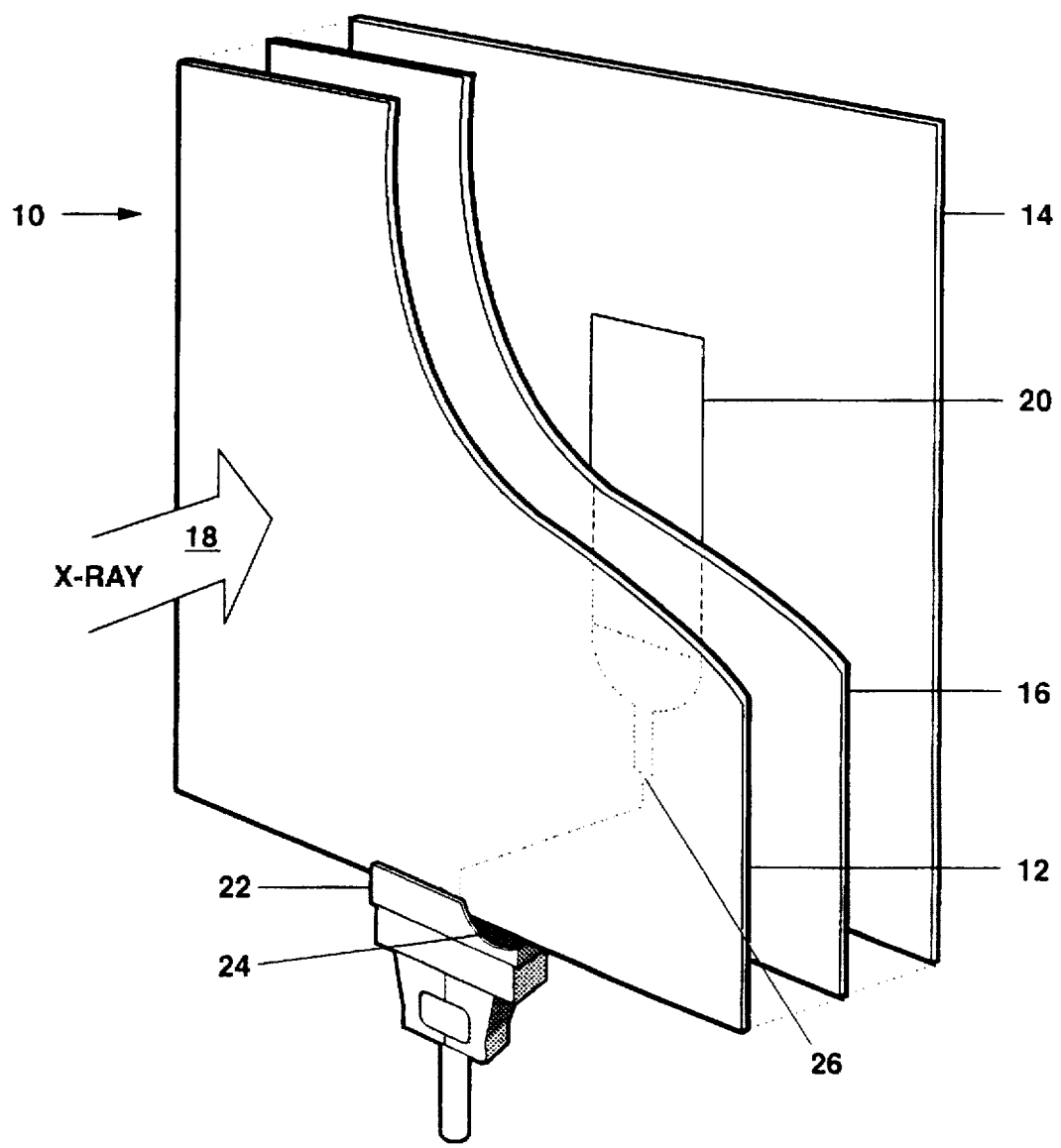
FIG. 1 illustrates the transparent detector in accordance with the present invention for use in combination with a X-ray cassette structure.

In preferred embodiment, the present invention comprises an X-ray detection device as illustrated in FIG. 1. The X-ray detection device 10 comprises a front and rear plate, 12 and 14, preferably made of foamed plastic material, such as SINTRA BOARD®, and placed therebetween a screen transmitter 16, which in preferred embodiment converts the incident X-rays 18 to radiation of a different wavelength, e.g. visible light. A preferable screen transmitter is a rare earth type transmitter available from MCI Optronics. In addition, the device 10 contains at 20 a detector for detecting said visible light radiation, wherein said detector is substantially invisible to said incident X-rays 18.

By substantially invisible, it is meant that the detector 20 will not transmit an image to an X-ray film, placed at the rear section 14, thereby destroying the imaging process of the X-ray procedure. Accordingly, the detector 20 is preferably made from a non-metallic material, and towards such objective, it is preferable to employ a flat fiber optic, as illustrated at 20 in FIG. 1. The flat fiber optic is available from Lumitex as a light-emitting panel woven from plastic optical fibers, preferably containing 3 fiber optic layers, and preferably containing a light reflective backing, thereby being substantially invisible to X-rays as noted. In addition, with respect to the preferred dimensions of the rectangular portion of detector 20, it is to be noted that said rectangular portion is preferably 3" wide and 4" high.

The device 10 further contains a connector 22 which is affixed to a sensor 24. Also shown in draft at 26 is the pathway of communication as between the fiber optic 20 and the sensor 24. The sensor preferably contains an amorphous silicon sensor cell, since it has been found that such sensor cell has excellent sensitivity to the green light emitted by the screen 16, as well as having excellent signal to noise ratio.

Although not illustrated in FIG. 1, the output line 26 of the sensor 22 sends an electric signal to a control unit, which control units are available from Westwood Biomedical, Westwood, Mass.. Such control units, as mentioned herein, are connected to the X-ray emitting device, and automatically determine, based upon the information supplied thereto by sensor 22, the proper exposure time for the X-ray film.

With regards to the cross-sectional dimensions of the components of FIG. 1, it is to be noted that device 10 is preferably used in combination with the X-ray film cassettes of the prior art. That being the case, the cross-sectional area of the front and rear plates 10 and 12, as well as that of the transmitter 16 is such that they substantially match that of a standard cassette which is commonly of the dimensions 14"×17" (l×w). It is worth noting that by configuring the transmitter screen in such dimension, although the screen material may attenuate the incident X-rays 18 to a level of approximately 10%, such attenuation can be compensated for by the photo-timer that is found in the control units noted above. In other words, the control unit will modify and extend the exposure times of incident X-rays the necessary time in milliseconds to accommodate the attenuation that is seen for the transmitter screen material employed herein.

In addition, since in preferred embodiment the device 10 is used in combination with X-ray film cassettes, it has been found advantageous to include on the device 10 a means for releasably engaginng the device with the cassettes, so that the device 10 can be configured in desired location thereof. Such means for releasably engagement preferably comprises a fibrous hook and loop fastening system, sold under the tradename VELCRO®. Furthermore, the detector 20 is thereby preferably attached and located in front of the cassette and over that area of the patient to be imaged, which then assures that a proper exposure time will be invoked for the particular region of medical concern.

Accordingly, those skilled in the art will appreciate that by the foregoing design, structural modification of X-ray cassettes can be avoided, and the medical practitioner now has access to an X-ray sensing device that can be immediately adapted to the medical practice. The invention herein removes the sensor from the cassette and places the sensor in front of the cassette tray, which holds the cassette. Up until the present invention, there was a problem with installing anything in front of the cassette, as such would show up on the X-ray film, which is not acceptable. The present invention overcomes such disadvantage by employing in preferred embodiment a flat fiber optic 20 which is substantially invisible to X-rays, but which allows for detection so that automated imaging procedures can still be employed.

What is claimed is:

1. An X-ray detection device for providing an output signal the value of which can be used to determine the amount of X-rays received at a selected region of an object comprising:

a converter for being energized by incident X-rays said converter producing radiation of a wavelength different from that of said X-rays, said converter aligned with X-ray film to be exposed, a radiation transmitter for transmission of substantially all of said radiation produced by said converter, said radiation transmitter positioned in front of said film and over said selected region of said object with respect to the direction of incident X-ray exposure, and wherein said radiation transmitter is substantially invisible to said X-rays and will not transfer an image to said X-ray film a sensor connected to said radiation transmitter, said sensor generating an output signal related to said radiation, the value of said output signal which can be used to determine the amount of X-ray radiation received at said transmitter location thereof.

2. The X-ray detection device of claim 1, wherein said converter for being energized by X-rays comprises an X-ray screen material, and wherein said radiation of a wavelength different from that of said X-rays is the wavelength of visible light.

3. The X-ray detection device of claim 1 wherein said radiation transmitter is a fiber optic.

4. The X-ray detection device of claim 3, wherein the fiber optic is substantially flat, wherein one side of said flat fiber optic is reflective thereby increasing the optical signal to the sensor.

5. The X-ray detection device of claim 1 wherein said sensor comprises an amorphous silicon sensor cell, where said sensor produces an electrical signal.

6. The X-ray detection device of claim 1, further containing two panels, which panels act to sandwich said convertor and radiation transmitter, said panels made of a foamed plastic material.

7. The X-ray detection device of claim 6, further containing an attachment device for attaching said panels to a cassette structure containing X-ray film to be exposed.

8. The X-ray detection device of claim 7, where said attachment device is a fibrous hook and loop fastener.

9. The X-ray detection device of claim 1 wherein said converter is of at least substantially the same cross-sectional area of said X-ray film to be exposed.

* * * * *